June 10, 1969     M. R. MILLER ET AL     3,448,647
APPARATUS AND PROCESS FOR PRODUCING CONSTANT VOLUME GASKETS
Filed Sept. 13, 1965
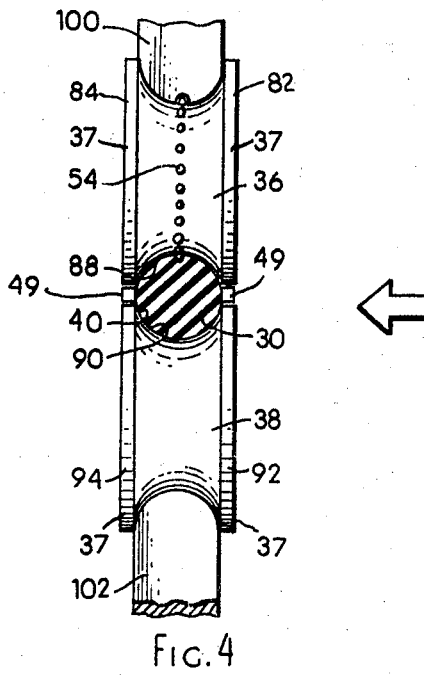
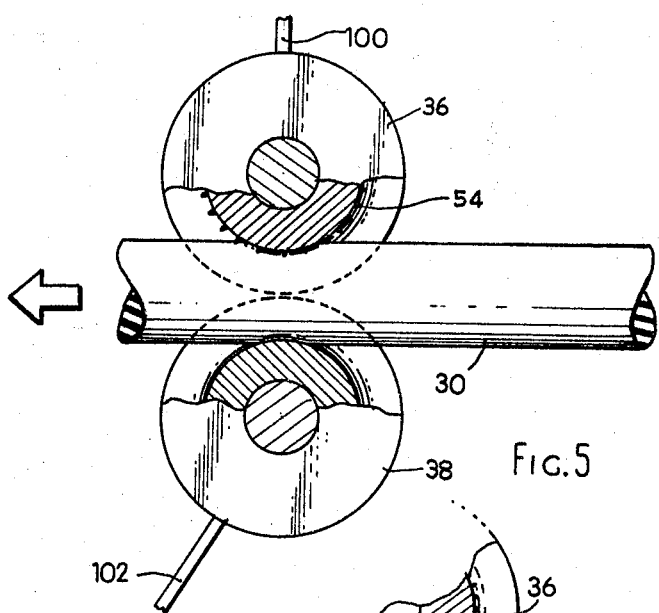
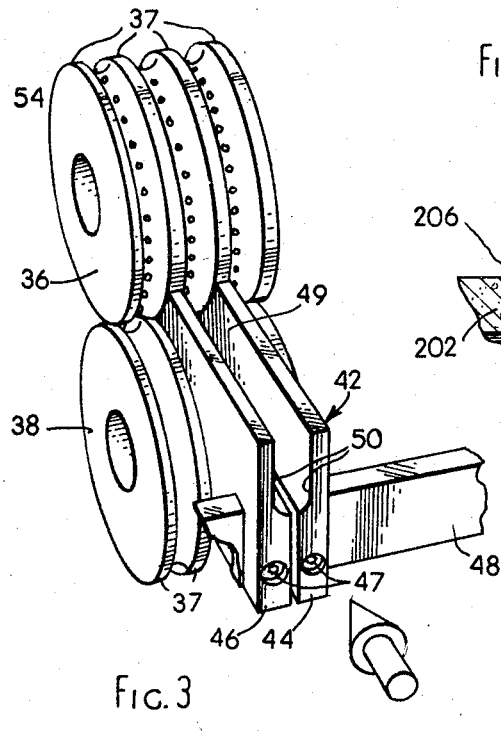
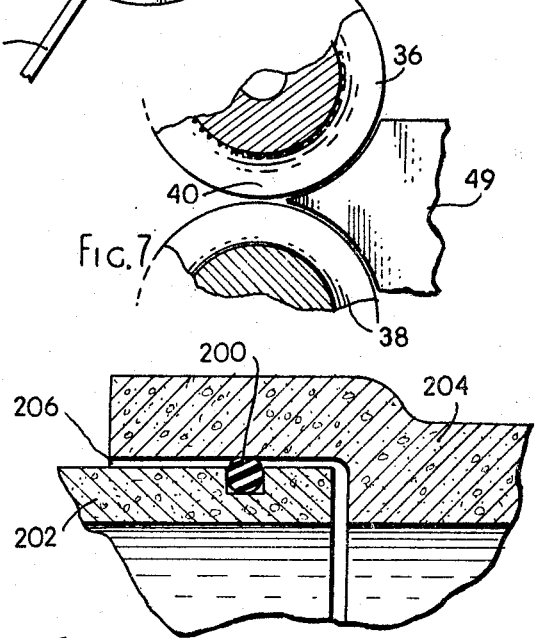
INVENTORS
MARION R. MILLER
LOWELL D. TEMPLE
by JEFFERS & YOUNG
ATTORNEYS

United States Patent Office 3,448,647
Patented June 10, 1969

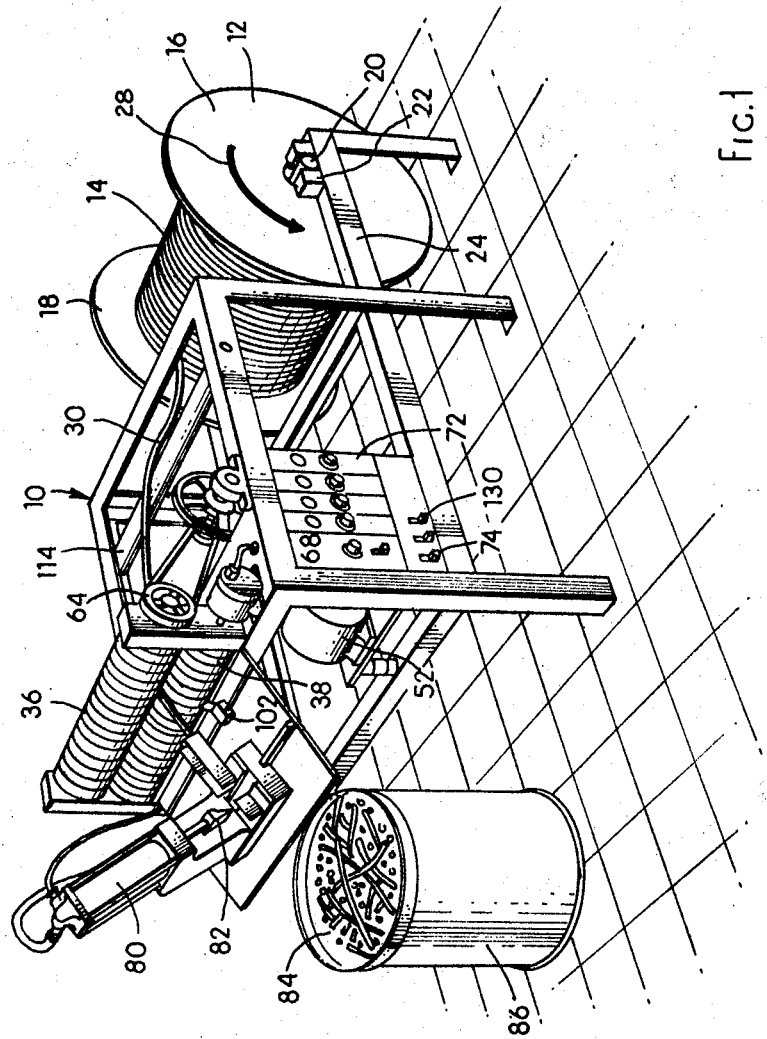
INVENTORS
MARION R. MILLER
LOWELL D. TEMPLE
by JEFFERS & YOUNG
ATTORNEYS

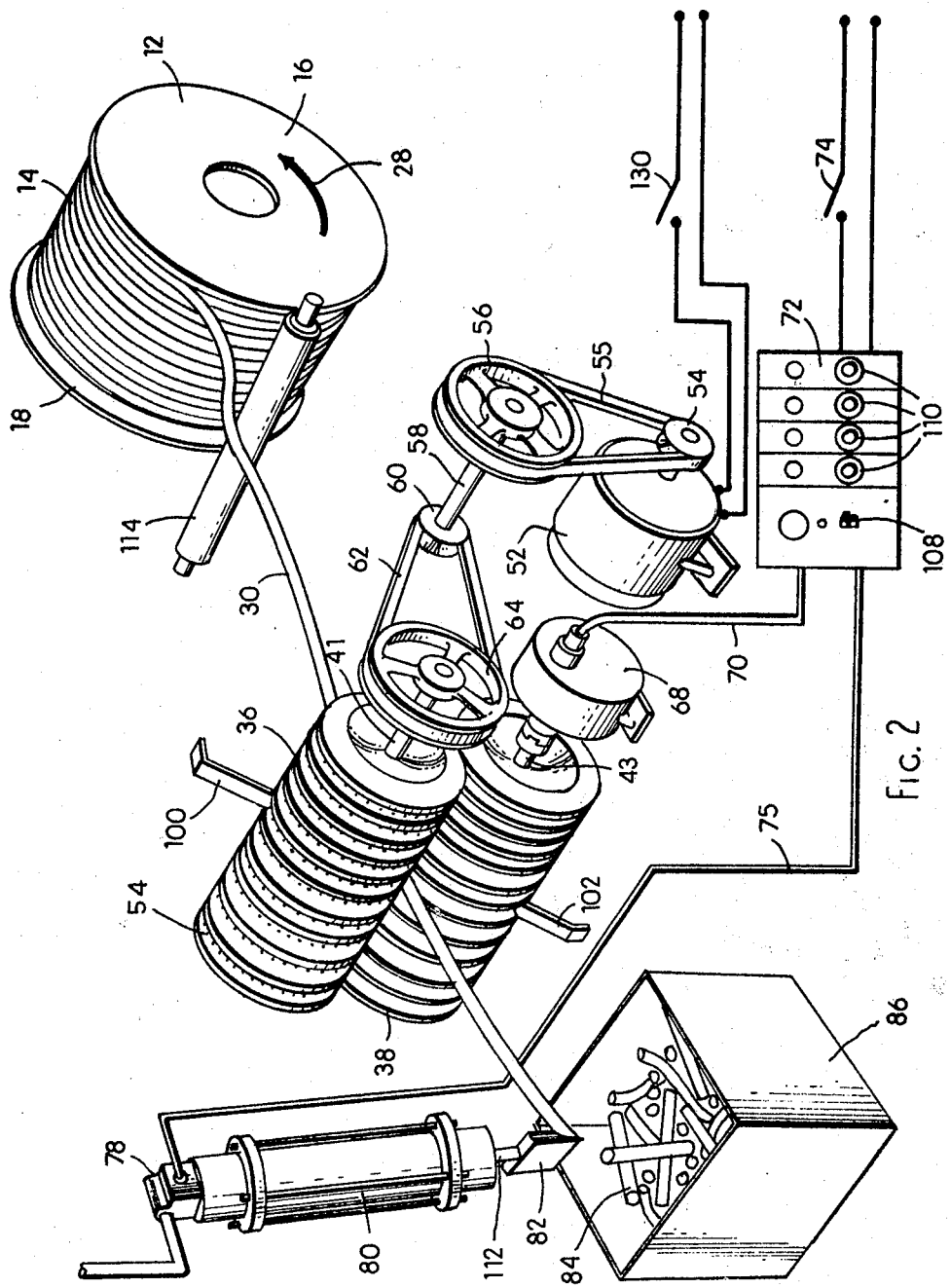

3,448,647
APPARATUS AND PROCESS FOR PRODUCING CONSTANT VOLUME GASKETS
Marion R. Miller and Lowell D. Temple, Fort Wayne, Ind., assignors to National Coupling Company, Inc., Fort Wayne, Ind., a corporation of Indiana
Filed Sept. 13, 1965, Ser. No. 486,913
Int. Cl. B26d 5/40
U.S. Cl. 83—423                                                     4 Claims

ABSTRACT OF THE DISCLOSURE

A gasket apparatus for producing gaskets of a predetermined volume from stock material having guide surfaces for receiving elastomeric stock material for imparting the stock material to a pair of opposed rotatable members having a cross section therebetween of a prescribed dimension and configuration and proportioned in relation to the stock material to effect a gripping connection which will transfer the stock material through the nip without slippage. Means for sensing the rotational movement of the rotatable members to provide a calibrated generated volume in accordance with the rotational movement of one of the rotatable members and severing means for cutting the stock material into lengths.

---

This invention relates to apparatus and process for producing constant volume gaskets for sealing conduits, pipes and the like. More particularly, this invention relates to both the process and apparatus for practicing the process, of producing from a variable cross-section elastomeric stock, an O-ring of whatever length is required to produce a constant volume of O-ring seal.

In the construction of pipe lines, the various sections are fitted end to end and where the sections are coupled or joined together, it is necessary to produce a seal so that material conveyed through the pipe cannot escape at these junctures. Obviously, if leakages should occur, then the effectiveness of the pipes or conduits as a conveyancing system is reduced.

It has been found that one of the best sealing methods is to use a flexible elastomeric O-ring which is located on one of the ends of the conduit and is compressed into sealing engagement with the opposed surface of the companion opening of the other conduit coupled thereto. Since the O-ring is compressed between the two surfaces by simply inserting one end within the other, the coupling connection is effected rapidly and for the most part efficiently. It has been found that in order to obtain the best possible seal that there be a uniform volume of seal or gasket so that all portions of the opposed conduit surfaces are uniformly and efficiently sealed against leakages through the joint where the pipe ends are fitted together. As a quality control, it is of substantial importance to achieve a uniform volume for the O-ring seal for a given installation in order to insure a proper seal. Obviously, if there is even as little as one defective joint the cost of construction is substantially increased in the event that, after installation, a repair has to be effected by digging up the laid pipe, locating and repairing the defective seal. For these reasons users of the pipe, installers and designers have made it the practice to specify what O-ring volume requirements are necessary for a given installation size pipes, so that regardless of variation in cross-section or length, the O-ring will, when stretched to fit over one pipe end and then compressed within the other pipe end, is capable of producing in spite of any variation in cross-section, length and tension, a uniform seal around the periphery of the joint.

Accordingly, it is one of the objects of the present invention to provide a process for producing within close tolerance ranges, a substantially constant volume O-ring seal or gasket which if adapted, in relation to a given size pipe or conduit fitting, will effect a uniform efficient seal around the circumference of the pipe joint.

It is another object of the present invention to provide a process which is adapted to produce a preferred constant volume gasket adapted to produce a desired sealing effect for a given dimension pipe joint. Thus the designer may calculate the optimum volume of O-ring necessary in relation to a given size conduit for producing a sufficient seal and the present invention will enable the production of a consistent volume within close tolerance limitations capable of effecting an efficient seal for the given size of pipe or conduit.

It is another object of the present invention to produce a process for fabricating a constant volume gasket which is operative continuously in order to produce constant volume gaskets in substantial quantities and at economical cost of production.

It forms an important feature of the present invention that the present invention can produce an O-ring of substantially constant volume regardless of variations in the cross-section of the O-ring and will effect such production by a continuous process.

It is another object of the present invention to provide an apparatus which is relatively inexpensive to assemble and to operate and will produce on a large volume an O-ring seal suitable for sealing conduits, and the like, at the joints of the pipes or conduits and it is intended that such apparatus be adapted, upon slight adjustment or modification, to produce different volume of O-ring seal or gasket but once selected the volume will remain the same.

Other objects and features of the present invention will become apparent from a consideration of the following description which proceeds with reference to the accompanying drawings, wherein:

FIGURE 1 is an isometric view of the apparatus for producing the O-ring seal, the end product of the apparatus being shown in cut lengths which are next assembled into an O-ring;

FIGURE 2 is an enlarged isometric detailed view of the feeding, metering and cutting components of the apparatus;

FIGURE 3 is an enlarged isometric view of the metering wheels by which the correct length of stock is determined to effect a constant volume O-ring;

FIGURE 4 is a transverse section view taken through the nip of the rolls and in the same plane as the axis of rotation of the rolls;

FIGURE 5 is a section view taken through the nip of the rolls and perpendicularly to the axis of rotation of the rolls;

FIGURE 6 illustrates a cross-sectional view of a pipe or conduit joint showing a cross-section of the O-ring seal and its sealing relation with the opposing surfaces of the joint at the pipe ends; and, FIGURE 7 is a side elevation view of the rolls and guide means.

Referring now to the drawings, the apparatus designated generally by reference numeral 10, includes a supply means such as a carton or reel. In the illustration we use a reel 12 comprised of a drum 14 having spaced sides 16, 18 and a stub axle 20 which is received in journal 22 carried by support frame 24. The drum 14 is free to rotate counterclockwise in the direction of the arrow 28 to dispense the stock 30 of resilient elastomeric sealing material which is of the desired cross-section shape and approximate area to produce an O-ring of constant volume. The stock is always of somewhat larger diameter than the nip 40 of a pair of rolls for proper operation of the opposed pairs of feed rolls or metering rolls 36, 38 (FIGURE 3). The stock is stretched while entering a respective one of the plurality of pairs of rolls 36, 38 which are mounted on shafts 41, 43.

Before the stock enters the nip 40 (FIGURE 4) between the rolls it is passed through a guidance means 42 consisting of two complementary plates 44, 46 which are slidably mounted on carriage 48 and then secured to the carriage by set screws 47. Each of the guidance plates 44, 46 has a recess 50 and the dimension of the recess together with the spacing between the two guide plates 44, 46 insures that the stock 30 passing therethrough will move toward the nip 40, i.e. its line of movement has a directionality so that it is aligned with the nip (FIGURE 5). By sliding the guidance means back and forth along the carriage 48 it is possible to select in accordance with the cord size which of the vertical pair of rolls is needed for producing a given constant volume gasket best adapted for sealing a given conduit or pipe. As shown in FIGURES 3, 4 and 7, a portion 49 of the guide means extends toward the nip to prevent the stock from extruding between the lands of the rolls. One set of the rolls 36 is the driving roll and the other set of rolls 38 which is driven, measures the amount of rotation necessary for producing a length of conduit which will produce a given volume of O-ring seal. The two sets of rolls while having adjacent lands are nevertheless slightly separated so that the driving roll 36 can only drive the other roll 38 through the stock. Should the stock be enough undersize so that slippage will occur then the driven roll will not register such length feeding through the nip of the rolls.

Referring to FIGURE 4, the upper set of rolls 36 which are the driving set of rolls may each include a plurality of small circumferentially disposed teeth 54 which engage and slightly protrude into the cross-section of the stock (FIGURE 5) in order to make a more positive drive, preventing slippage between the rolls and stock as the stock moves through the nip. Because there is no slippage between the rolls and the stock, it is possible to calibrate the degree of rotational movement of the lower roll 38 and relate it to a given volumetric amount of stock passing therethrough. Thus having a given cross-sectional area of nip (FIGURE 4) and given the volumetric amount of O-ring seal which it is desired to produce, such area and volume can be related to the angular amount of turning required of the pulley or roll 38 to produce a length of stock yielding the desired volumetric requirement of O-ring seal.

The upper set of rolls 36 is driven by a motor 52 (FIGURE 2) having an output pulley 54 connected by a belt 55 to a take-off pulley 56 mounted on shaft 58 with a reduction pulley 60 at the other end of the shaft 58. Wheel 60 is in turn connected by belt 62 through pulley 64 to shaft 41 driving the rolls 36. The lower set of rolls 38, mounted on shaft 43, provide the calibrated measurement of degree of angular movement related to the length of stock necessary for producing a constant volume O-ring. Since there is no slippage which can occur between the stock and either of the pair of opposed wheels 36, 38 the degree of angular movement of 38 can be calibrated to a desired length of stock capable of producing a constant volume of O-ring. Shaft 43 has a measuring device 68 which measures the amount of angular movement of the pulley wheels and conveys this information as an electrical signal through cable 70 to a suitable control panel 72 which is turned off and on by means of switch 74 and is calibrated to provide an output signal through the cable 75 for operating a valve (not shown) in the head 78 of an air cylinder 80 adapted to operate a blade 82. The blade 82 will sever the stock after the prescribed angular movement of the lower pulley wheel and the severed stock sections 84 are collected in a container 86. The input or supply flow of stock 30 is adapted to be somewhat larger in cross-section than the cross-section of the nip so that as the drive pulley 36 turns, the calibrated lower wheel 38 will also turn.

The greater the diameter of the inflow of stock 30 the shorter the length of stock required to produce the calibrated degree of rotation of the roll 38. While the severed sections of stock vary in length the lengths are related to the cross-section so that each section is of the same volume.

The roll 36 has a groove 88 bounded by flats 82, 84 and the groove 88 is opposed by a second groove 90 of roll 38 also having spaced flats 92 and 94. In operative position the opposed flats are slightly spaced with a portion of the guide means received therein, the combined cross-sections of the rolls define a space therebetween which, as previously mentioned, is slightly less than the diameter of the stock 30 passing therethrough. For a given degree of rotation of wheel 38 there will be generated a precise volume of material passing through the nip, and consequently it is possible to produce a constant volume of O-ring seal assuming there is no slippage which occurs between the stock and the roll 38, which measures and relates roll rotation to stock length. The two factors militating against such slippage are: the stock is of slightly greater cross-section than the nip and the serrations 54 imbed into the cross-section of the stock. The end result is that combining the two factors of nip cross-sectional area and the calibrated angular movement of the lower wheel 38 we can produce a constant volume of severed stock 84. The two wheels 36, 38 are of course held against movement away from each other.

The cut sections 84 which are of constant volume are formed into a circular shape and the ends thereof are joined together by bonding, splicing or securing together either by mechanical or chemical means in any suitable manner. When the O-rings are expanded over the pipe end, even though they are of variable length, and are under variable tension, the constant volume insures a uniform cross-sectional distribution of material around the periphery of the joint of the pipe so that when the pipe ends are fitted in telescoping relation to produce the pipe joint the cross-section of the seal will be deformed into a seal of uniform sealing area around the periphery of the joint. There is sufficient of such material (FIGURE 6) to produce an adequate seal and one which has a uniformly efficient sealing action around the entire periphery of the joint.

As the two pulley wheels 36, 38 rotate, some of the wax or other protective material from the stock 30 tends to become imbedded within the complementary grooves 88, 90 and to remove this material we use stationary scrapers 100, 102 having ends which extend into the grooves 88, 90 to remove any accumulation of wax. In the absence of the removal of this buildup of wax, the cross-sectional area of the nip will no longer remain constant and it is desirable for the best results of the invention to maintain a constancy in cross-sectional area at the nip.

In operation, the control panel 72 is adjusted by first turning the switch 108 to an on position and adjusting the control buttons 110 so that for a given cross-sectional area of the pulley there will be generated a constant volume of stock, there being a calibrated angular degree of movement for the selected roll 38 which will generate a constant volume for the stock and then will signal the valve 78 through line 74 to cause the air motor to actuate the blade 82 mounted on piston rod 112 to effect the cutting operation. In operation, once the stock is stripped off of the supply reel or carton and passed over idler roll 114 it is fed through the guide plates 44, 46 which are adjusted along the length of the carriage bar 48 to pass through a selected one of the pairs of opposed rolls 36, 38. The stock is uniformly of slightly greater cross-section than the cross-sectional size of the nip. The motor 52 is energized, driving the pulley wheel 54 through belt 55 connected to the pulley 56 connected to shaft 58, pulley 60, belt 62, pulley 64, and thereby actuating the shaft 41 and the wheels 36 are caused to run continuously. Intermittently, as soon as the wheels 38 have been actuated a given angular distance which is related, together with the cross-sectional area of the nip 40 to produce a constant volume output of stock, the measuring device 68 will produce an output signal through line 70 to control panel 72 and the signal will then be generated as an output from line 75 to actuate the air valve 78 and air cylinder 80, causing the blade 82 to sever the stock into a length 84. Immediately upon cutting, a recording device (not shown) in control panel 72 is reset and starts to measure the succeeding stock material feeding between the rolls. There is thus produced a constant flow of material between the rolls and an intermittent cutting operation to produce rapidly a substantial number of cut pieces of stock all of which have the same volume. The cut pieces of stock 84 are then transferred to a mandrel (not shown) and the ends are wrapped circularly and the brought-together ends are spliced together either by mechanical or chemical means. The circular O-ring 200 (FIGURE 6) being of constant volume, is adapted when stretched over spigot 202 to produce a constant sealing action against bell 204 at the joint 206 which is produced by the bringing together of the pipe ends. The operation, as described, occurs with minimal supervision by an operator; all that is required is the initial calibration, threading of the length of stock initially and supplying the machine with a new supply of stock from a fresh reel or carton when all of the stock has been exhausted from the existing supply reel.

The apparatus can be varied to change the size, spacing and shape of the tines or teeth 54 in wheel 36. It is not necessary that there be a connection of this type to prevent slippage; however, it has been found that in order to minimize any occurrence of slippage that slight projections form a more positive connection and reduce the possibility of any slippage occurring. By thus driving the stock from one pulley but measuring the extent of movement from the opposed pulley wheel it is possible to accurately determine the generated volume to achieve a constant volume between each operation of the blade 82.

Adjusting the apparatus is a very simple and easy expedient of sliding the guide means along the carriage 48 so that they will line up with any desired pair of rolls and the stock is then fed into the nip from the supply reel and the extent of angular movement for a given volume, in relation to the cross-sectional area of the nip and length, is fed into the control panel 72. The motor is then commenced to operate by turning on the switch 130 and the apparatus will continue to produce without stop a plurality of sections of stock.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

We claim:

1. Apparatus for producing gaskets of a predetermined volume from stock having a preferred cross section, comprising: guide means having guide surfaces adapted to receive a length of elastomeric stock material and adapted to impart a directionality to such stock material which is in slidable engagement therewith, a pair of opposed rotatable members having a cross section therebetween of a prescribed dimension and configuration and proportioned in relation to said stock to effect a gripping connection therebetween which translates the stock through the nip without slippage therebetween, means for sensing the extent of rotational movement of said rotatable members to provide a calibrated generated volume in accordance with the cross-sectional area and extent of rotational movement of one of said rotatable members, means for driving the other said rotatable members, and severing means actuated responsively to movement of one of said rotatable members through a prescribed length whereby a constant volume of stock is produced.

2. Apparatus for producing gaskets of a predetermined volume from stock having a preferred cross section, comprising: guide means having guide surfaces adapted to receive a length of elastomeric stock material and adapted to impart a directionality to such stock material which is in slidable engagement therewith, a pair of opposed rotatable members having a cross section therebetween of a prescribed dimension and configuration and proportioned in relation to said stock to effect a gripping connection therebetween which translates the stock through the nip without slippage therebetween, means for sensing the extent of rotational movement of said rotatable members to provide a calibrated generated volume in accordance with the cross-sectional area and extent of rotational movement of one of said rotatable members, means for driving the other said rotatable members, severing means actuated responsively to movement of one of said rotatable members through a prescribed length whereby a constant volume of stock is produced, and means for protruding at least partially into said stock as it passes through the nip of said rotatable members to form a positive driving connection preventing relative sliding movement between the stock and said rotatable member.

3. Apparatus for producing gaskets of a predetermined volume from stock having a preferred cross section, comprising: guide means having guide surfaces adapted to receive a length of elastomeric stock material and adapted to impart a directionality to such stock material which is in slidable engagement therewith, a pair of opposed rotatable members having a cross section therebetween of a prescribed dimension and configuration and proportioned in relation to said stock to effect a gripping connection therebetween which translates the stock through the nip without slippage therebetween, means for sensing the extent of rotational movement of said rotatable members to provide a calibrated generated volume in accordance with the cross-sectional area and extent of rotational movement of one of said rotatable members, means for driving the other said rotatable members, severing means actuated responsively to movement of one of said rotatable members through a prescribed length whereby a constant volume of stock is produced, means for protruding at least partially into said stock as it passes through the nip of said rotatatble members to form a positive driving connection preventing relative sliding movement between the stock and said rotatable members, and means for removing extraneous material between said rotatable members during the rotation thereof.

4. Apparatus for producing gaskets of a predetermined volume from stock having a preferred cross section, comprising: guide means having guide surfaces adapted to receive a length of elastomeric stock material and adapted to impart a directionality to such stock material which is in slidable engagement therewith, a pair of opposed rotatable members having a cross section therebetween of a prescribed dimension and configuration and proportioned in relation to said stock to effect a gripping connection therebetween which translates the stock through the nip without slippage therebetween, means for sensing the extent of rotational movement of said rotatable members to provide a calibrated generated volume in accordance with the cross-sectional area and extent of rotational movement of one of said rotatable members, means for driving the other said rotatable members, severing means actuated responsively to movement of one of said rotatable members through a prescribed length whereby a constant volume of stock is produced, means for protruding at least partially into said stock as it passes through the nip of said rotatable members to form a positive driving connection preventing relative sliding movement between the stock and said rotatable members, means for removing extraneous material between said rotatable members during the rotation thereof, and mounting means whereby said guide means are movable laterally to direct the movement of the stock in a prescribed direction.

No references cited.

DOUGLAS J. DRUMMOND, *Primary Examiner.*

U.S. Cl. X.R.

83—208, 369; 156—378, 510